United States Patent [19]

Tsai

[11] Patent Number: 5,921,350
[45] Date of Patent: Jul. 13, 1999

[54] MULTI-PURPOSE LUBRICATING OIL FEEDING MACHINE CONTROL APPARATUS

[76] Inventor: Wei-Che Tsai, No. 192, Chien-Kuo N. St., Tsao-Nan Li, Wu-Chi Town, Taichung County, Taiwan

[21] Appl. No.: 08/864,820

[22] Filed: May 29, 1997

[51] Int. Cl.$^6$ .................................................. F01M 1/18
[52] U.S. Cl. .......................... 184/6.4; 184/108; 184/6.28; 364/140
[58] Field of Search ............................... 184/6.4, 108, 26, 184/6.28, 7.4; 364/140; 340/631, 680

[56] References Cited

U.S. PATENT DOCUMENTS

| | | | |
|---|---|---|---|
| 3,678,631 | 7/1972 | Payne et al. | 184/6.4 |
| 4,445,168 | 4/1984 | Petryszyn | 364/140 |
| 5,125,480 | 6/1992 | Gregory et al. | 184/6.26 |
| 5,244,350 | 9/1993 | Yang | 417/12 |
| 5,381,874 | 1/1995 | Hadank et al. | 184/6.4 |

*Primary Examiner*—John A. Jeffery
*Assistant Examiner*—David Fenstermacher
*Attorney, Agent, or Firm*—Rosenberg, Klein & Bilker

[57] ABSTRACT

A multi-function lubricating oil feeding machine control apparatus is provided that responds to different conditions, and includes an oil feeding machine having a controller mounted thereon. The controller comprises a power supply circuit, a microprocessing unit, a multiplex scanning circuit, a motor drive circuit, a status display circuit, an external status input interface circuit, a status output interface circuit, and a function setting circuit. The oil feeding machine may be set for intermittent feeding of oil according to a set time value, or a number of rotations of the work machine, or to feed oil after the starting of the work machine. Additionally, the previous time value or number of rotations may be memorized and accumulated in the next count, so that feeding may start after a specific value or number of rotations has been reached. The external status input interface circuit may be connected to different kinds of detectors or sensors such as a counter, a liquid level sensor, and a pressure sensor to provide other functions. The status output interface circuit may be utilized to transmit on-site conditions to monitoring personnel located remotely from the site, via radio signals or wires.

1 Claim, 3 Drawing Sheets

MULTI-PURPOSE LUBRICATING OIL FEEDING MACHINE CONTROL APPARATUS

BACKGROUND OF THE INVENTION

1. Field of the Invention

The present invention generally relates to an improvement of a control o a lubricating oil feeding machine. More particularly, the present invention is directed to a multi-functional lubricating oil feeding machine control apparatus which may feed oil according to set time, the number of rotations (working rate) of a machine, memorize the previous rotational frequency before the machine is stopped and adding the data to the next count when the machine is started again. Furthermore, the data obtained may be sent via wire or radio to monitoring personnel located remotely from the site, for better control of the conditions of the machine.

2. Prior Art

Machines need lubricating oil for smooth operation. With conventional lubricating oil feeding machines, all of them are designed to feed oil intermittently according to a set time value. In other words, a timer is provided for the motor pump circuit of the lubricating oil feeding machine, so that the motor pump electrically operates or does not operate, according to the set time. Although conventional lubricating oil feeding machines may achieve the object of intermittent oil feed, there are the following disadvantages:

1. Using a timer to control oil feed is a mechanical type of control, and cannot memorize completion time. For instance, if the travel of rotation is interrupted (temporary stopping of the machine), the previous time of rotation cannot be memorized and accumulated into the next count. In other words, when the machine is started again, oil has to be fed. Excessive oil may not be good for certain machines.
2. For some machines such as boring machines that should be oiled according to the number of rotations or its operational frequency, it is not suitable to determine the time of feeding according to the time of rotation.
3. Those in the art often calculate the value of time required for one operation manually and then set the feed time. Under normal operation of the machine, the set feed time may be correct. But if the operational frequency is delayed, it will be necessary to set a proper feed time.
4. Some have adopted a counter instead of a timer for counting the operational frequency. However, this method has the disadvantages that:
   A. If a workpiece takes more time to machine, it will be necessary to oil the work machine several times. This conventional method of counting is not suitable since a work machine will normally process various kinds of workpieces. With this conventional method, it will be necessary to provide different oil feeders for different kinds of workpieces on which the machine works.
   B. For users, they must purchase different kinds of oil feeding machines, which will increase cost.
5. In particular, when the work machine or the oil feeding machine lacks oil, or the oil pressure is abnormal, the oil feeding machine can only generate warning sounds or lights at the site, which cannot reach remote places, such as a monitoring office. In case the on-site monitoring personnel fails to note the warning sounds or lights, there may be serious damage.

In view of the above drawbacks of the prior art, it is desirable to have a control apparatus for oil feeding machines which may adapt to the needs of different models of work machines and may inform off-site monitoring personnel of the status of the coil feeding machine through a radio or wired apparatus.

SUMMARY OF THE INVENTION

A primary object of the present invention is to provide a control apparatus for oil feeding machines, which is equipped with a microprocessing unit and push buttons to allow the user to set the conditions for oil feeding so that oil may be fed at a specific time, after a specific number of rotations, or at the start of the work machine. Besides, the work time or rotations of the previous operation of the work machine may be memorized and accumulated in the next counting.

Another object of the present invention is to provide a control apparatus for oil feeding machines, which is equipped with an external status input interface circuit having a plurality of input functions for connection with several control functions such as counting, oil level detection, oil pressure detection, and the status of the machine, for providing the oil feeding machine with the necessary control bases.

A further object of the present invention is to provide a control apparatus for oil feeding machines, which is equipped with an alarm signal drive circuit, for emitting alarm sounds in case there are abnormal operations of the machines, and a status output interface circuit, for connection by wires or radio to a remote location, so that off-site monitoring personnel may monitor the operations of the machines from a remote location.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 3:
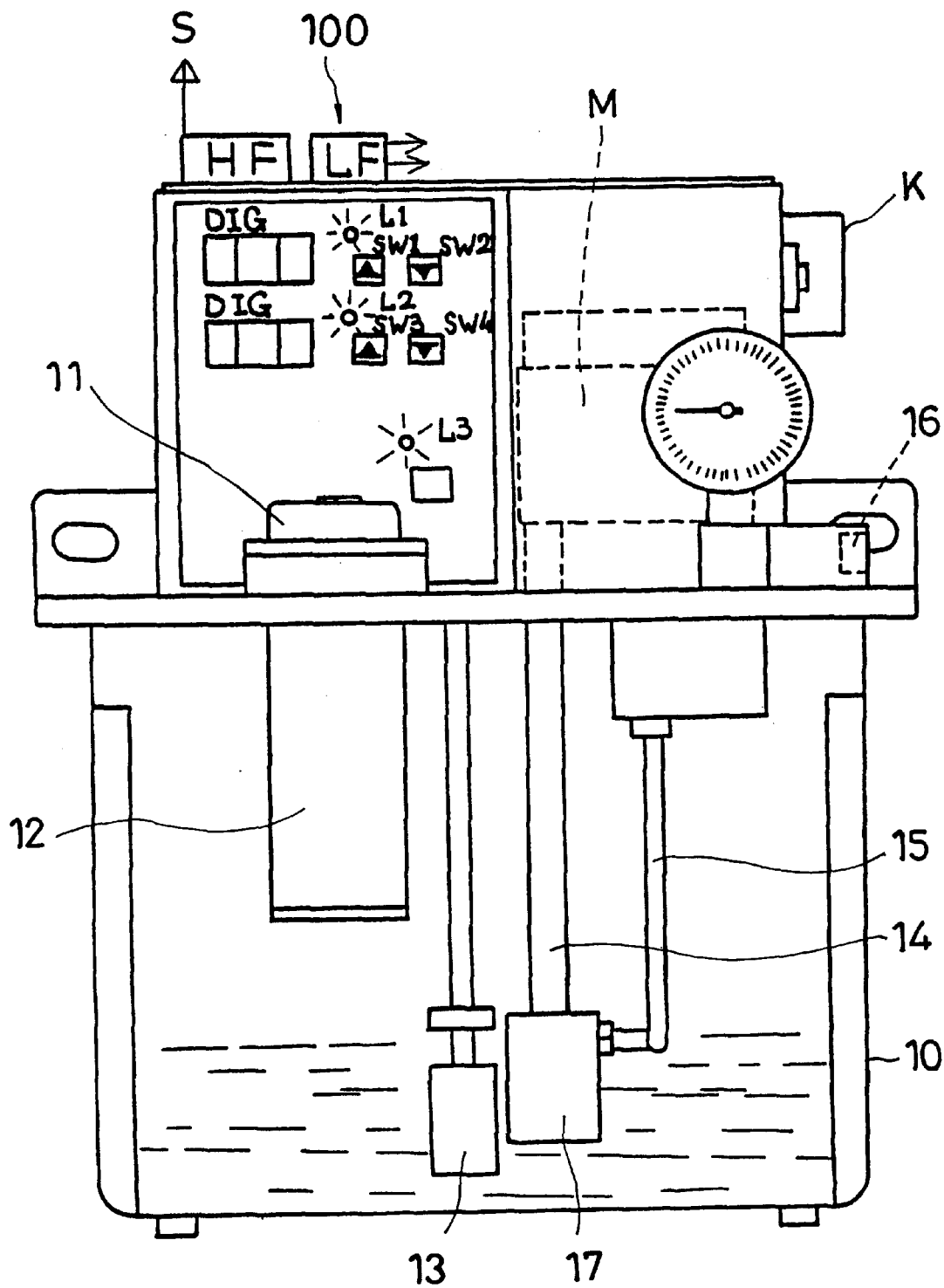

With reference to FIG. 3, the structure of the oil feeding machine essentially comprises an oil tank 10, having a controller 100 and a motor pump M mounted thereon, and being provided with a filler hole 11, and a filter mesh 12. The motor pump M is provided with an oil suction tube 14, an oil suction head 17, and an oil outlet tube 15. The controller 100 is connected to an oil level sensor 13 and may be set to operate the motor pump M. The controller 100 may set the required control conditions, and cause the motor pump M to operate. By means of the oil suction tube 14, the oil suction head 17, oil in the oil tank 10 flows via the oil outlet tube 15 and an output port 16 to lubricate the work machine. The oil level sensor 13 detects the level of oil in the oil tank 10 and sends a signal to the controller 100 to inform the operator of the opportune time to refill oil.

Figure 2:
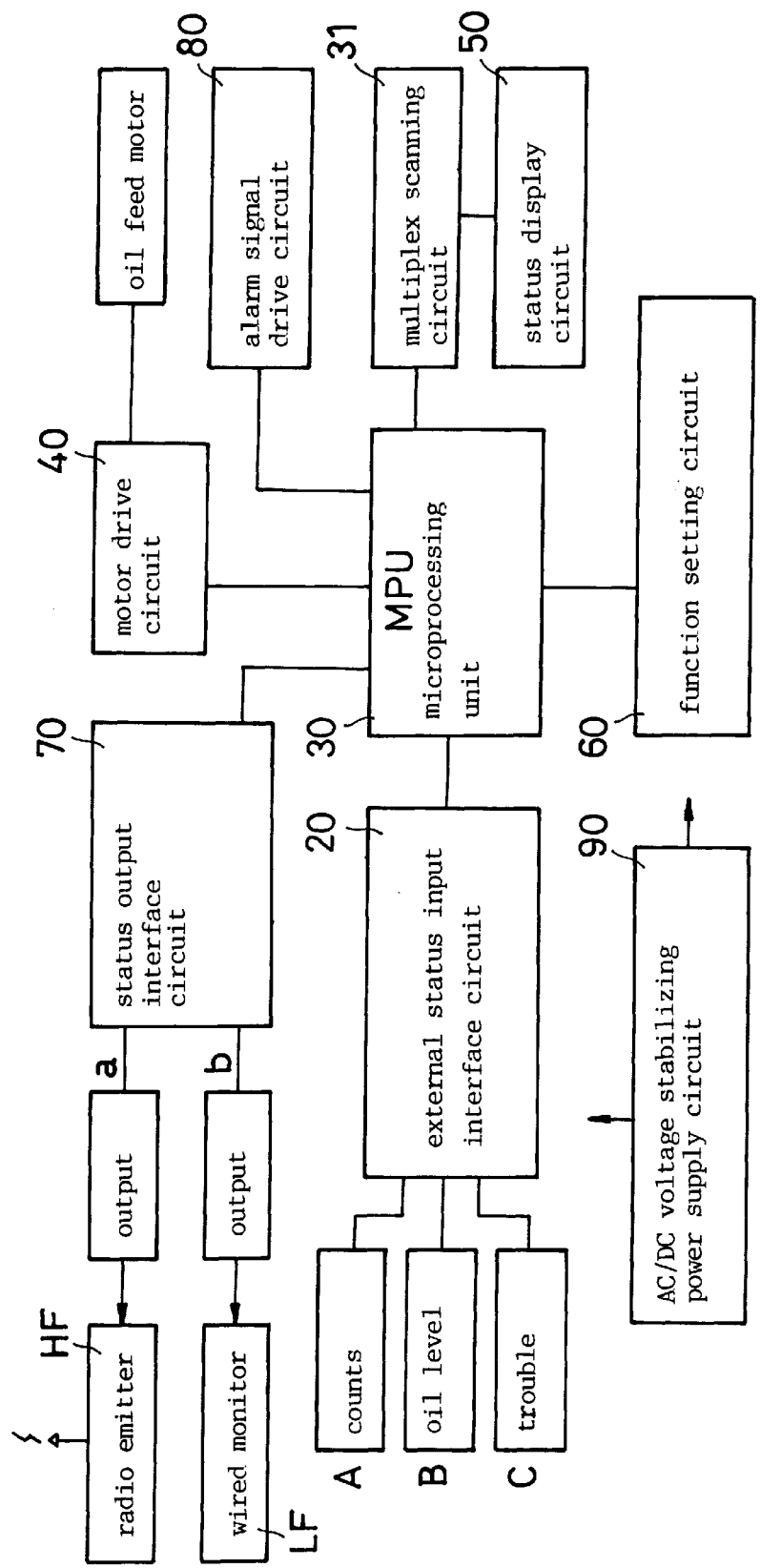
FIG. 2 is a schematic block diagram of the control circuit of the present invention; and, FIG. 3 is a schematic plan view of the present invention and the oil feeding arrangement.

The controller 100 according to the present invention essentially comprises, referring to FIGS. 2 and 3, a power supply circuit 90, an external status input interface circuit 20, a single chip microprocessing unit MPU 30, a multiplex scanning circuit 31, a motor drive circuit 40, a status displaying circuit 50, a function setting circuit 60, a status output interface circuit 70, and an alarm signal drive circuit 80.

Figure 1:
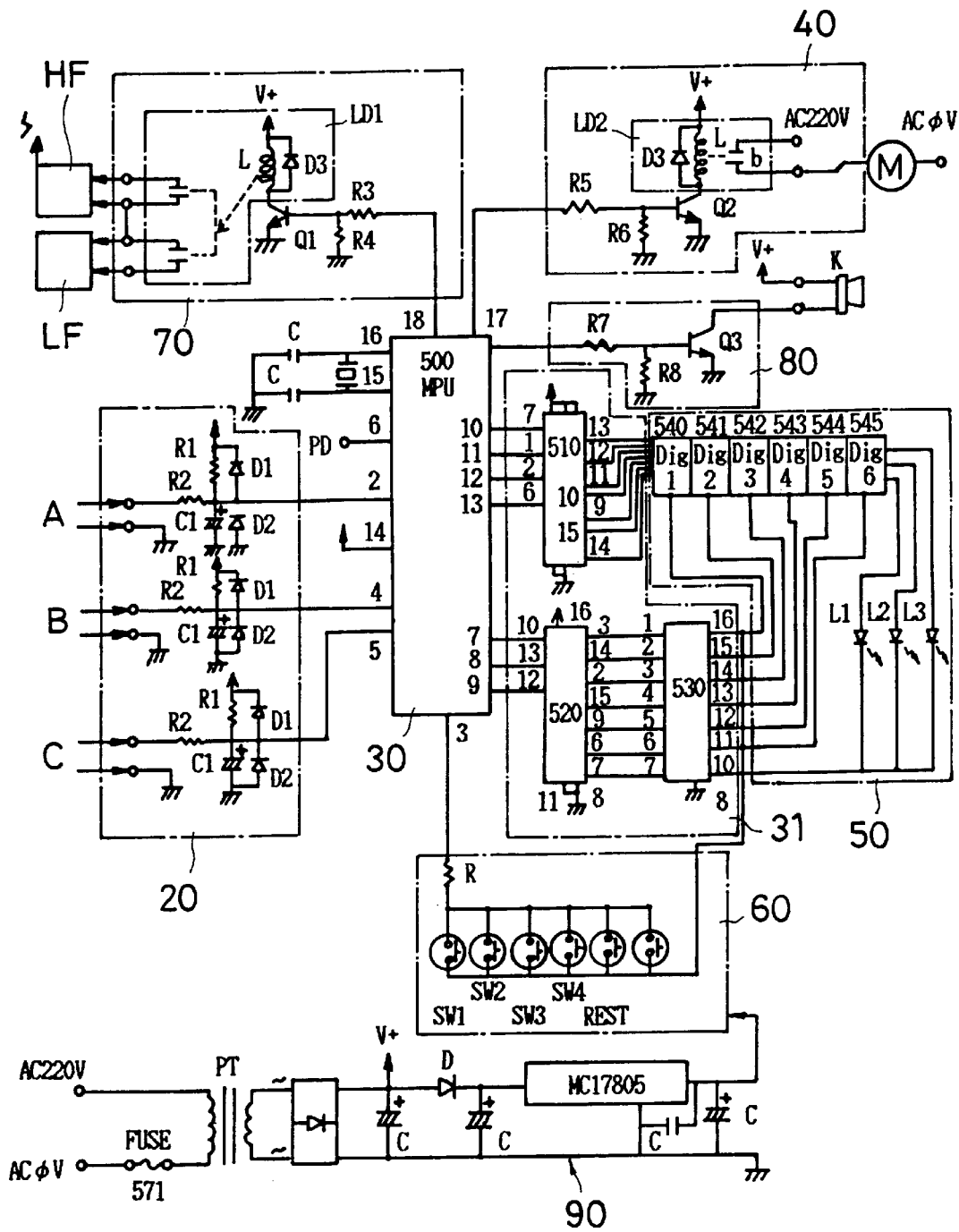
FIG. 1 is a circuit diagram of the control circuit means of the present invention.

Referring addition to FIG. 1, the external status input interface circuit 20 includes a plurality of input circuits, each being formed by diodes D1, D2, resistors R1, R2, and a capacitor C1, which constitute a cross-shaped circuit. The resistors R1, R2 and capacitor C1 have the function of stabilizing the voltage, while the diodes D1, D2 provide protection from surges. The various input ends of each input circuit may be respectively connected to a counter, the oil level sensor, and a pressure sensor, according to a need to provide counting, oil level detection, and output pressure value detection.

The single chip microprocessing unit 30 performs the functions of memorizing, setting, and computing. It may function with the multiplex scanning circuit 31 to set the required functions and the external operational conditions, and output control signals.

The motor drive circuit 40 is provided with a relay LD2, a transistor Q2 and resistors R5, R6, for receiving signals from the microprocessing unit MPU 30. The transistor Q2 causes the motor pump M to operate.

The status displaying circuit 50 includes a plurality of digital display DIG, light emitting diodes L1, L2, L3, for displaying the time value or frequency value of the set functions.

The function setting circuit 60 includes a plurality of push buttons SW1, SW2, SW3, SW4, a forced feeding push button REST, and a resistor R. Values (time value, frequency value) may be set in the microprocessing unit MPU 30 according to predetermined requirements.

The status output interface circuit 70 is provided with a relay LD1, a transistor Q1, and resistors R3, R4. The transistor Q1 receives signals from the microprocessing unit MPU 30 and is caused to operate, so that the relay LD1 outputs a control signal. The output contact of the relay LD1 may be connected to a radio emitter HF for transmission of radio signals to a corresponding receiver at an operator's location. Alternatively, wires may be distributed to a monitor LF located remotely so that the work machines may be monitored off site.

The alarm signal drive circuit 80 is provided with a transistor Q3, resistors R7, R8, and a buzzer K, for receiving signals from the microprocessing unit MPU 30 representing abnormal conditions, to generate an alarm sound at the site.

The operation and effects of the oil feeding machine and the controller 100 will be described in further detail hereinbelow with reference to FIGS. 2 and 3.

1. Multiple function setting and control

The function setting circuit 60 of the present invention cooperates with the microprocessing unit MPU 30 and a pulse oscillation circuit composed of its quartz oscillator and capacitor C. The function setting circuit 60 also works in conjunction with push buttons SW1, SW2, SW3, SW4, REST and status display circuit 50, and multiplex scanning circuit 31, to allow input and calculation of time values, and calculation of the number of operations (rotations) of the work machine. The values thus obtained are then displayed.

In other words, the present invention may set and control the calculated work time, and the number of operations (rotations) to provide intermittent lubrication in accordance with the predetermined requirements of the workpiece and the work machines. Such adjustability provides users with great facility and convenience. There is no need to replace oil feeding machines or prepare several oil feeding machines. Besides, the present invention may match various machine models and has various functions.

2. Convention setting and detection of conditions

The external status input interface circuit 20 of the present invention is provided with a plurality of input ends to which the user may assemble desired detectors or sensors, e.g., counter, oil level sensor, pressure sensor, or other kinds of sensors.

3. Alarm

When operation is normal, the microprocessing unit MPU 30 outputs normal signals to the motor drive circuit 40 to connect the transistor Q2 so that the relay LD2 is also connected, thereby causing the motor pump M to operate. Oil is therefore drawn from the oil tank 10 for lubricating the work machine. When the set time value or the count has been reached, the transistor Q2 is disconnected so that the motor pump M starts operation, and the oil feeding machine will perform intermittent oil feeding as set.

When the external status input interface circuit 20 has detected abnormal conditions (such as lack of oil, abnormal output pressure), the microprocessing unit MPU 30 will output two signals. One will connect the transistor Q3 of the alarm signal drive circuit 80 to sound the buzzer K at the site. The other will connect the transistor Q1 of the status output interface circuit 70 to cause the relay LD1 to operate so that the radio emitter HF sends out a signal, which will be received by a receiver carried by monitoring personnel. Alternatively, a monitoring device (such as a buzzer) disposed elsewhere but connected by wires to the site is actuated to alarm the monitoring personnel. By means of the present invention, monitoring personnel need not be stationed at the site at any time, and may still monitor the operation of the oil feeding machine from a place that is remote from the site. Such arrangement helps save labor and provides speedier monitoring in case of abnormal operations of the oil feeding machine.

In view of the above, the present invention has wide applications. It may adapt to different models of work machines and different kinds of workpieces. There is better mobility in terms of monitoring, and labor is saved.

Although the present invention has been illustrated and described with reference to the preferred embodiment thereof, it should be understood that it is in no way limited to the details of such embodiment but is capable of numerous modifications within the scope of the appended claims.

What is claimed is:

1. A multi-purpose lubricating oil feeding apparatus, comprising:
    an oil tank;
    an oil suction tube extending into said oil tank and having an oil suction head coupled to a distal end thereof;
    a motor driven pump mounted to said oil tank and having an output coupled in fluid communication with an oil outlet for discharging oil therefrom to lubricate a machine, said pump having an inlet coupled in fluid communication with said oil suction head through said oil suction tube;
    an oil level sensor disposed in said oil tank for output of an oil level signal responsive to a detected level of oil within said oil tank;

a counter coupled to the machine for accumulating a number of operations thereof;

a pressure sensor for monitoring an output pressure value; and, a controller mounted to said oil tank and electrically coupled to said motor driven pump for controlling operation thereof, said controller including:
  a. an external status input interface circuit having a plurality of inputs respectively electrically coupled to said oil level sensor, said counter and said pressure sensor;
  b. a microprocessor having an input coupled to said external status input interface circuit for input of a count from said counter, said oil level signal and said output pressure value, and storage thereof, said microprocessor providing parameters corresponding to a time calculation and a calculation of a number of operations of the machine;
  c. a motor drive circuit having an input coupled to said microprocessor and an output coupled to said motor driven pump for controlling said motor driven pump responsive to at least a selected one of said parameters;
  d. a function setting circuit coupled to said microprocessor for manual selection of said at least one parameter;
  e. a status displaying circuit having digital displays and light emitting diodes coupled to said microprocessor for displaying said parameters;
  f. a status output interface circuit coupled to said microprocessor for output of a status signal therefrom;
  g. a remotely located monitoring device coupled to said status output interface circuit for receipt of said status signal transmitted thereby, said transmission of said status signal being by one of a wireless or wired transmission path; and,
  h. an alarm signal drive circuit having a buzzer for output of an audible alarm and an input coupled to said microprocessor, said alarm signal drive circuit outputting said audible alarm responsive to an abnormal condition signal output from said microprocessor.

* * * * *